(12) United States Patent
McGill et al.

(10) Patent No.: US 11,530,856 B2
(45) Date of Patent: Dec. 20, 2022

(54) SYSTEMS AND METHODS FOR CONTROLLING COMPRESSOR MOTORS

(71) Applicant: TRANE INTERNATIONAL INC., Davidson, NC (US)

(72) Inventors: Seth M. McGill, West Salem, WI (US); Aaron Salesman, Viroqua, WI (US); Christopher Espelien, Holmen, WI (US); Josef L. Schmidt, Colorado Springs, CO (US)

(73) Assignee: TRANE INTERNATIONAL INC., Davidson, NC (US)

( * ) Notice: Subject to any disclaimer, the term of this patent is extended or adjusted under 35 U.S.C. 154(b) by 329 days.

(21) Appl. No.: 16/222,559

(22) Filed: Dec. 17, 2018

(65) Prior Publication Data

US 2020/0191454 A1     Jun. 18, 2020

(51) Int. Cl.
| | |
|---|---|
| *F25B 31/00* | (2006.01) |
| *F25B 43/02* | (2006.01) |
| *H02P 29/62* | (2016.01) |
| *H02P 27/08* | (2006.01) |

(52) U.S. Cl.
CPC ............ *F25B 43/02* (2013.01); *F25B 31/008* (2013.01); *H02P 27/085* (2013.01); *H02P 29/62* (2016.02)

(58) Field of Classification Search
CPC ...... F25B 43/02; F25B 31/008; H02P 27/085; H02P 29/62
See application file for complete search history.

(56) References Cited

U.S. PATENT DOCUMENTS

| | | | |
|---|---|---|---|
| 6,205,808 B1* | 3/2001 | Beekman | ................ F04C 28/28 418/DIG. 1 |
| 9,742,343 B2 | 8/2017 | Okamoto et al. | |
| 2009/0191082 A1 | 7/2009 | Yoshimura et al. | |
| 2016/0290671 A1* | 10/2016 | Schuster | ............. F04C 18/0215 |

(Continued)

FOREIGN PATENT DOCUMENTS

| | | |
|---|---|---|
| CN | 101910756 A | 12/2010 |
| CN | 104389759 A | 3/2015 |

(Continued)

OTHER PUBLICATIONS

Matsuda, Compressor Control System, 2004, Full Document (Year: 2004).*

(Continued)

*Primary Examiner* — Nael N Babaa
(74) *Attorney, Agent, or Firm* — Hamre, Schumann, Mueller & Larson, P.C.

(57) ABSTRACT

This disclosure is directed to systems and methods for controlling compressor motors, particularly varying the operation parameters of the motor to provide heat to a lubricant of the motor. The operation parameters include one or more of a pulse width modulation switching frequency, a pulse width modulation frequency switching pattern, or a torque/amp ratio of a drive of the compressor. The efficiency of the motor may be reduced to provide heat, with the heat improving lubricant quality and drive efficiency, to increase an overall efficiency of compressor operations. Methods may include determining a lubricant quality, and determining operational parameters that improve lubricant quality.

14 Claims, 2 Drawing Sheets

(56) References Cited

U.S. PATENT DOCUMENTS

2017/0248354 A1* 8/2017 Lord .................... F28D 1/0461
2017/0306953 A1* 10/2017 Choi ................... F04C 18/0269
2019/0072307 A1* 3/2019 Liu ........................ F04B 49/00

FOREIGN PATENT DOCUMENTS

| CN | 105358919 | A | | 2/2016 | |
|----|-----------|---|---|--------|---|
| CN | 107218711 | A | * | 9/2017 | ............. F04B 49/00 |
| EP | 1217216 | A2 | | 6/2002 | |
| EP | 3579390 | A1 | | 12/2019 | |
| JP | 2006170575 | A | * | 6/2006 | ............. F04B 49/00 |
| JP | 2006170575 | A | | 6/2006 | |
| KR | 20070030073 | A | | 3/2007 | |
| WO | 2008041996 | A1 | | 4/2008 | |
| WO | 2018/207767 | A1 | | 11/2018 | |

OTHER PUBLICATIONS

Extended European Search Report, European Patent Application No. 19215555.4, dated Apr. 8, 2020 (7 pages).
Extended European Search Report, European Patent Application No. 19215555.4, dated Aug. 5, 2021 (5 pages).
Office Action issued in Chinese Patent Application No. 201911307375. 1, dated Aug. 9, 2022 with English translation (19 pages).

* cited by examiner

SYSTEMS AND METHODS FOR CONTROLLING COMPRESSOR MOTORS

FIELD

This disclosure is directed to systems and methods for controlling compressor motors, particularly varying the operation parameters of the motor to increase the heat of a discharge flow of a compressor to refine lubricant recovered from the discharge flow.

BACKGROUND

Compressors typically include rotating components that are driven by motors. Motors are defined by stator and rotor components. The rotating components are typically supported by and allowed to rotate by bearings, with the bearings lubricated to facilitate the rotation. For example, screw compressors have one or more rotors driven via a shaft connected to a motor. In operation, the compressor discharge includes lubricant from the bearings that support and allow rotation of the shaft to drive the rotors and/or from the rotors themselves. Typically, the lubricant is separated from the discharge flow of the compressor by a separator located downstream of the compressor discharge, and the recovered lubricant is directed back to the bearings.

SUMMARY

This disclosure is directed to systems and methods for controlling compressor motors, particularly varying the operation parameters of the motor to increase the heat of a discharge flow of a compressor to refine lubricant recovered from the discharge flow.

Compressor systems typically include a motor driving the compressor. The motor may receive power from a drive, with the power provided by the drive controlling operation of the motor. The compressor includes rotating components supported by bearings. The bearings are lubricated by a lubricant. The lubricant at the bearings is exposed to the flow of refrigerant through the compressor, and some of the lubricant is carried away in the discharge flow of the compressor. This lubricant may be recovered at a lubricant separator downstream of the discharge port of the compressor, and returned to the bearings. The quality of the lubricant, e.g. the mass fraction of refrigerant dissolved in the lubricant, may be affected by its temperature, and the temperature of the lubricant is related to the discharge superheat of the compressor.

Efficient operation of compressor motors can reduce the amount of heat given off by the motor. This can result in low discharge temperatures during these efficient operations. Compressor operations at low pressure ratios and, in variable-volume compressors, low volume ratios also can result in reduced superheating of the discharge of the compressor. Further, many modern refrigerants tend to have higher solubility in lubricants, and make maintenance of lubricant rheological properties and/or lubricant quality, e.g. the mass fraction of refrigerant dissolved in the lubricant, more demanding. Heating lubricant may help improve lubricant quality and/or rheological properties, and enable the lubricant to provide sufficient lubrication when the compressor system is operated at certain portions of the compressor operational map, such as low pressure ratios and/or low volume ratios in variable-volume compressors. Increasing the discharge superheat of the compressor is one way of heating the lubricant to refine the lubricant by improving the separation of lubricant from refrigerant, reducing the dilution of the lubricant.

Motor and drive operations can provide heat to refrigerant in the compressor system, resulting in increased temperatures at the compressor discharge. The operation of the motor and the drive may result in inefficiencies at the motor that cause losses that generate waste heat. The waste heat from the motor may be transferred to refrigerant entering the compressor, for example if the refrigerant is used for motor cooling prior to entering the suction port of the compressor. The losses in motor operation may be balanced with drive efficiency improvements resulting from operation at more efficient portions of the compressor operational map under certain conditions. Overall efficiency may thus be improved by using operational parameters that are selected to provide heat to lubricant, even where the operational parameters are not optimal for motor efficiency alone.

A compressor system according to an embodiment includes a compressor including one or more bearings, one or more rotating components, a suction port, and a discharge port, a motor coupled to at least one of the one or more rotating components, a drive, providing power to the motor, and a controller. The controller is connected to the drive. The controller is configured to vary one or more drive parameters based on a lubrication condition. Varying the one or more drive parameters increases a heat produced by at least one of the motor and the drive.

In an embodiment, the one or more drive parameters include at least one of a pulse width modulation switching frequency and a pulse width modulation frequency switching pattern. In an embodiment, varying the pulse width modulation switching frequency and the pulse width modulation frequency switching pattern increases a temperature of the motor.

In an embodiment, the one or more drive parameters include a torque/amp ratio of the motor and the drive. In an embodiment, varying the torque/amp ratio of the motor and the drive includes at least one of adjusting an induction saturation curve, adjusting a back EMF constant, or injecting a high frequency component into the waveform.

In an embodiment, the compressor system further includes a refrigerant flow path configured to convey a refrigerant flow to the suction port of the compressor, and the motor is located in the refrigerant flow path, upstream of the suction port with respect to the refrigerant flow.

In an embodiment, the controller is configured to vary the one or more drive parameters based on at least one of a compressor speed, a compressor pressure ratio, and a compressor volume ratio.

In an embodiment, the compressor system includes one or more sensors configured to measure one or more lubricant metrics, and the controller is configured to vary the one or more drive parameters based on the one or more lubricant metrics. In an embodiment, the one or more lubricant metrics include a discharge superheat at the discharge port of the compressor.

A method of operating a compressor system including a compressor, a motor, and a drive, according to an embodiment, includes determining whether a lubricant is to be refined based on a lubricant condition. When the lubricant is to be refined, the method continues by determining one or more adjusted drive parameters for at least one of the motor and the drive, wherein the one or more adjusted drive parameters increases a heat produced by at least one of the motor and the drive. The method further includes operating the motor and the drive based on the one or more drive parameters.

In an embodiment, the lubricant condition is an operational state of the compressor. In an embodiment, the operational state of the compressor includes at least one of a compressor speed, a compressor pressure ratio, and a compressor volume ratio.

In an embodiment, the method further includes measuring at least one lubricant metric using one or more sensors located in or on the compressor system, and the lubricant condition is determined based on the lubricant metric. In an embodiment, the lubricant metric is a discharge superheat of the compressor. In an embodiment, the lubricant metric is a viscosity. In an embodiment, the lubricant metric includes a temperature and a pressure. In an embodiment, the lubricant metric includes a bearing cavity pressure and a bearing cavity pressure. In an embodiment, the lubricant metric is a refractive index of the lubricant.

In an embodiment, the one or more adjusted drive parameters include one or more of a pulse width modulation switching frequency and a pulse width modulation frequency switching pattern. In an embodiment, the one or more of the pulse width modulation switching frequency and the pulse width modulation frequency switching pattern increase a temperature of a stator of a motor of the compressor.

In an embodiment, the method further includes directing a flow of refrigerant over the stator of the motor prior to the flow of refrigerant entering a suction port of the compressor.

In an embodiment, the one or more adjusted drive parameters include a torque/amp ratio of the drive and the motor. In an embodiment, the adjusted drive parameters include at least one of an induction saturation curve, a back EMF constant and a high frequency injection into the waveform.

In an embodiment, determining the one or more adjusted drive parameters includes referencing a lookup table correlating the lubricant metric with the one or more drive parameters.

DRAWINGS

DETAILED DESCRIPTION

This disclosure is directed to systems and methods for controlling compressor motors, particularly varying the operation parameters of the motor to increase the heat of a discharge flow of a compressor to refine lubricant recovered from the discharge flow.

Figure 1:
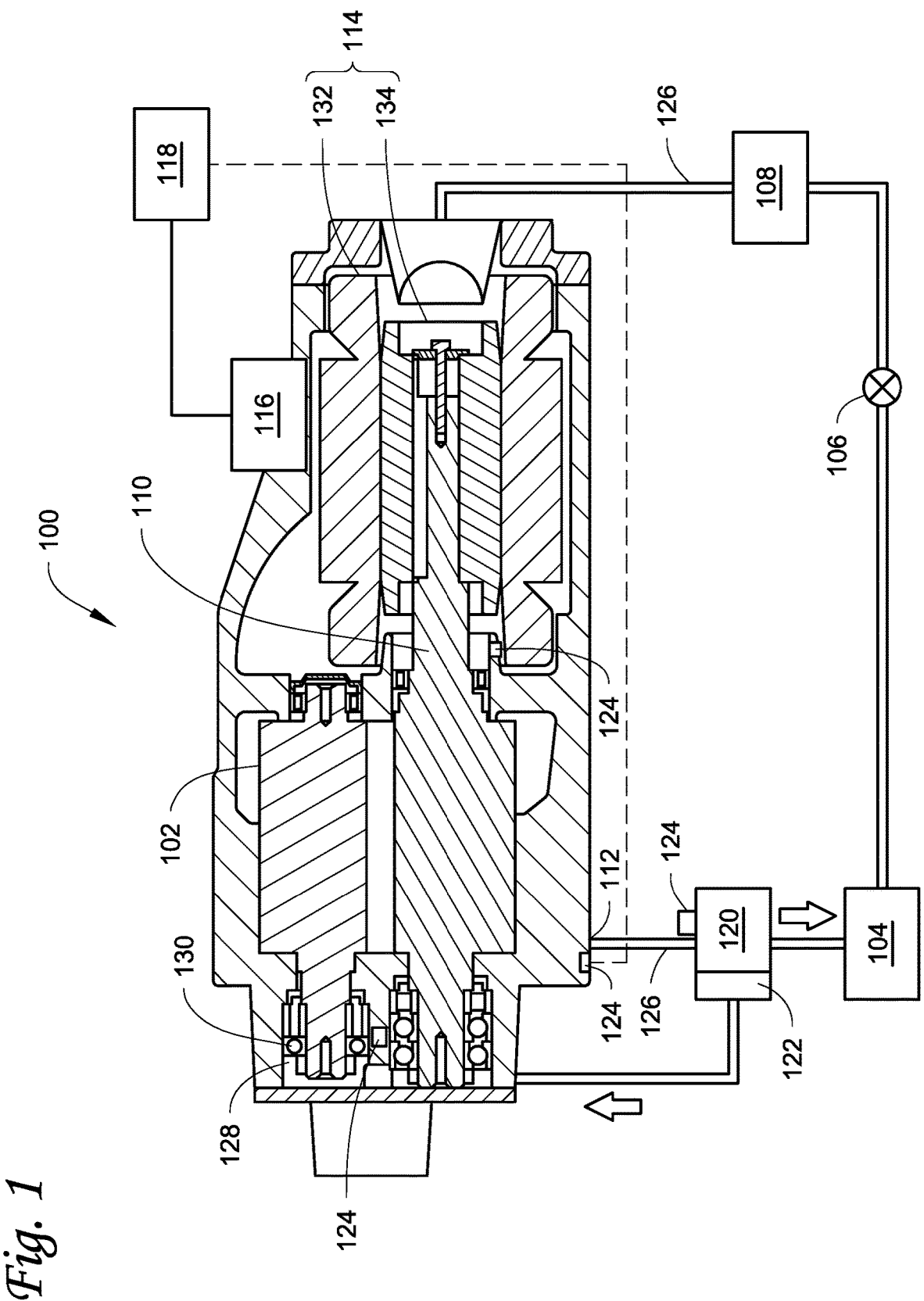
FIG. 1 shows a block diagram of a refrigerant circuit including a compressor according to an embodiment.

FIG. 1 shows a refrigerant circuit 100 including a compressor 102 according to an embodiment. Refrigerant circuit 100 further includes a condenser 104, an expansion device 106, and an evaporator 108. Refrigerant compressed by compressor 102 flows through refrigerant flow path 126 to condenser 104, expansion device 106 (such as an expansion valve, orifice, or other such expander that can reduce the pressure of the refrigerant), and evaporator 108, then returning to compressor 102 via the refrigerant flow path 126. Refrigerant circuit 100 may be used in, for example, a heating, ventilation, air conditioning and refrigeration (HVACR) system.

Compressor 102 includes a suction port 110 and a discharge port 112. Refrigerant enters compressor 102 via the suction port 110 and is discharged from the compressor at discharge port 112. Compressor 102 includes bearing cavity 128, where bearings 130 allow rotation of components of compressor 102. Compressor 102 may be a screw compressor, where the rotating components are rotors that are rotated to form compression chambers between the lobes and grooves of the rotors. Compressor 102 may be a variable speed screw compressor. Compressor 102 may further have a variable volume ratio. Compressor 102 may be a scroll compressor, such as a variable speed scroll compressor. Compressor 102 is operated by motor 114, which receives power from drive 116. Drive 116 is connected to controller 118. Sensors 124 may be located along the refrigerant circuit 100 or at compressor 102, for example along refrigerant flow path 126, at suction port 110, discharge port 112, or within compressor 102.

In an embodiment, motor 114 is an AC electrical motor. Motor 114 receives power from drive 116. The power received by motor 114 from drive 116 may be an AC signal. The power received by motor 114 may be, for example, a simulated sine wave of AC current generated via pulse width modulation of DC power. Motor 114 includes a rotor 134, connected to a shaft of compressor 102, and a stator 132 that receives power from the drive and causes the rotor 134 to rotate. The stator 132 produces heat during operations, for example due to resistance losses at the windings and/or the back iron of the stator 132, and the amount of heat and loss may vary based on the characteristics of the simulated AC sine wave of the power being provided. Stator 132 may be, for example, a random wound, form wound, switched reluctance, or other form of stator. Rotor 134 may also generate heat during operations, for example due to resistance losses of eddy currents in the rotor 134. Rotor 134 may be, for example, an induction rotor, an internal and/or external permanent magnet rotor, a switched reluctance rotor, or the like. In an embodiment, the suction gas flow of compressor 102 passes over motor 114 as a coolant for the stator 132 and rotor 134, and thus the temperature of refrigerant entering the compressor may be increased by heating at the stator 132 and/or rotor 134. In an embodiment, the stator 132 and rotor 134 of motor 114 may be located along refrigerant flow path 126, upstream of the suction port 110 of compressor 102. In an embodiment, motor 114 may be cooled by a jacket cooling flow path, where channels on the outer diameter of the stator 132 allow refrigerant to flow into and out of a jacket of stator 132. In an embodiment, motor 114 may be cooled by a stator lamination flow path, where channels are punched into stator laminations allowing injection of gas into and flow through the stator iron.

Drive 116 controls the operation of motor 114 by controlling the supply of power to the motor 114. Drive 116 uses pulse width modulation to simulate an AC sine wave, and outputs the AC sine wave to motor 114 to operate motor 114 at desired operational parameters such as a particular speed. Drive 116 may be, for example, a variable speed drive. The parameters of the AC sine wave to motor 114 may be governed by a pulse width modulation pattern and a pulse width modulation frequency. In an embodiment, the pulse width modulation pattern may be the control of each of the individual drive phase outputs to achieve the desired three-phase line-to-line voltage waveform. The pulse width modulation frequency may be the rate at which the pulse width modulation pattern is performed.

Controller 118 directs the supply of power by drive 116 to motor 114 by providing the parameters, including frequency, amplitude, and orientation relative to the rotational position of rotor 134 of the AC sine wave output by drive 116. The controller 118 may select the pulse width modulation pattern and the pulse width modulation frequency used by drive 116 to generate the AC sine wave provided to motor 114.

In an embodiment, controller 118 may control the pulse width modulation pattern and/or pulse width modulation frequency based on the operating conditions of the compressor. Standard pulse width modulation patterns and/or frequencies that reduce stator and/or rotor loss in motor 114 may be used when the compressor 102 is operated under normal conditions, for example speeds and volume ratios when compressor 102 is a variable-volume compressor that are defined as such at certain load conditions, for example by threshold values or a lookup table referenced by controller 118. A modified pulse width modulation pattern or frequency that increases loss at stator 132 and/or rotor 134 may be used under conditions such as a low pressure ratio and/or a low volume ratio when compressor 102 is a variable-volume compressor. The low pressure and/or volume ratios may be defined by lookup tables, threshold values, or the like that are referenced by controller 118.

Controller 118 may also be connected to one or more sensors 124 measuring one or more characteristics associated with rheological properties of the lubricant and/or lubricant quality such as discharge superheat and/or characteristics associated with lubricant effectiveness (e.g. rheological properties such as viscosity or viscosity ratios) of the lubricant in compressor 102. The one or more characteristics measured by sensors 124 may include, for example, pressure and/or temperature readings at compressor suction, compressor discharge and/or within the bearing cavity 128 of the compressor, refractive index of the lubricant, viscosity of the lubricant, and the like. Controller 118 may determine lubricant rheological properties and/or lubricant quality based on the one or more characteristics. In an embodiment, lubricant quality may be an estimate based on the discharge superheat of the compressor. The rheological properties and/or the lubricant quality may be compared to a target value by controller 118. When the lubricant quality and/or lubricant effectiveness do not meet or exceed the target value, controller 118 may adjust the operation of drive 116 to affect the lubricant quality and/or lubricant effectiveness, for example by increasing the discharge superheat of the compressor 102. In an embodiment, controller 118 may be integrated into drive 116

In an embodiment, controller 118 may vary other parameters of the drive 116 and motor 114 operations instead of or in addition to varying pulse width modulation pattern and/or frequency based on operating conditions of the compressor, lubricant rheological properties, and/or lubricant quality. Controller 118 may direct changes that lower the torque-amp metric of the drive 116 and motor 114, such as changes to the induction saturation curve and/or back EMF constant, injection of a high-frequency signal into the waveform, or other such actions. These changes de-tune the motor to increase the losses at the motor 114 and drive 116 and thus generate heat that, for example, can be transferred to the suction flow of refrigerant into compressor 102 when it is used as a coolant for the drive 116 and motor 114.

A lubricant separator 120 may be located along the discharge flow path of the compressor, for example between the discharge port 112 of the compressor 102 and the condenser 104. The lubricant separator 120 removes lubricant from the flow of refrigerant discharged from the compressor 102. The lubricant may be returned to the compressor 102, for example to a bearing cavity 128 of the compressor. The quality of the lubricant recovered at the lubricant separator 120, e.g. the mass fraction of lubricant versus refrigerant, may be affected by, for example, the temperature of the lubricant. Lubricant removed from the flow of refrigerant by lubricant separator 120 may be directed to a lubricant storage 122. Lubricant storage 122 may be a lubricant sump included in the lubricant separator 112, or a reservoir or other fluid storage.

Figure 2:
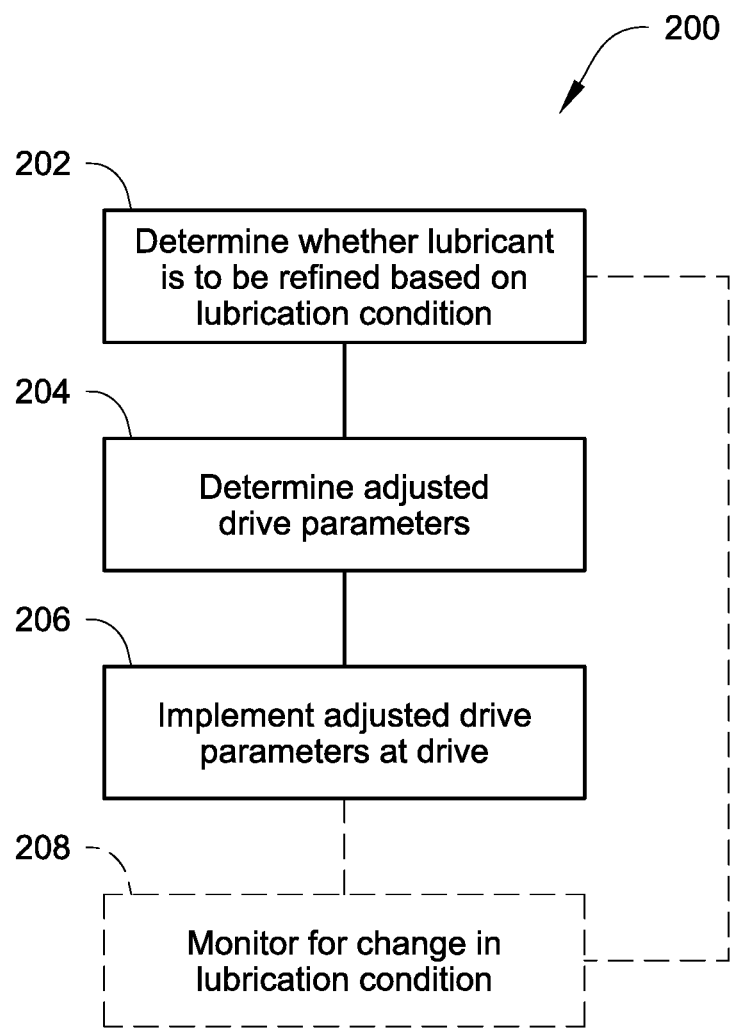
FIG. 2 shows a flowchart of a method according to an embodiment.

FIG. 2 shows a flowchart of a method 200 according to an embodiment. Method 200 starts with determining whether lubricant is to be refined 202. When it is determined that the lubricant is to be refined in 202, adjusted drive parameters are determined 204. The adjusted drive parameters determined at 204 are implemented at the drive at 206. Method 200 may iterate periodically or, optionally, when it is detected that the compressor operational state has changed 208.

Whether the lubricant is to be refined is determined at 202 based on a lubrication condition.

In an embodiment, the lubrication condition is an operational state of the compressor, including, for example the volume ratio, speed, economizer state, mechanical unloader state, and/or pressure ratio of the compressor. Certain operational states of the compressor may be associated with poor lubricant rheological properties and/or low lubricant quality conditions. In an embodiment, the operational states may be associated with these conditions, for example, via a lookup table or an operational map. The operational state of the compressor may be compared to the operational states associated with poor lubricant rheological properties, low lubricant quality, and/or increased lubrication effectiveness thresholds to determine whether lubricant is to be refined.

In an embodiment, the lubrication condition used to determine whether the lubricant is to be refined is one or more lubricant metrics. The lubricant metrics may be compared to threshold values for the lubricant metrics. The one or more lubricant metrics may include, for example, one or more of a discharge superheat of the compressor, a temperature reading from a bearing cavity of the compressor, a pressure and temperature at the bearing cavity of the compressor, a viscosity of the lubricant, a refractive index of the lubricant or other such measurements that are reflective of or capable of being used to determine lubricant rheological properties and/or lubricant quality=. The threshold values may be, for example, predetermined values. The predetermined values may be based on, for example, drive efficiency and/or predicted impacts on bearing reliability and/or lifetime.

Adjusted drive parameters are determined at 204. The adjusted drive parameters may be one or more parameters affecting losses at the drive and/or motor that may result in a change to the heat provided to refrigerant in the compressor and result in increased discharge temperature from the compressor. In an embodiment, the adjusted drive parameters are determined 204 using a lookup table including adjusted drive parameters for particular compressor operating conditions such as compressor speed, pressure ratio and/or volume ratio. In an embodiment, the adjusted drive parameters are computed based on parameters relating to the quality and/or effectiveness of a lubricant, for example discharge superheat. Examples of drive parameters that may have adjusted values determined at 204 include, for example, the power signal provided by the drive to the motor such as a pulse width modulation switching frequency and/or a pulse width modulation frequency switching pattern, high-frequency injection, and/or a torque/amp ratio of the drive and motor. The adjusted drive parameters at 204 may reduce the efficiency of the motor and/or drive of the compressor themselves to generate the additional heat provided to the refrigerant passing through the compressor.

In an embodiment, pulse width modulation of the power supplied to the motor may be used to control the motor. Pulse width modulation includes providing DC power according to a pattern and a frequency to simulate an AC power sine wave. The pattern used, or the frequency may be varied to introduce additional stator and/or rotor losses which result in the generation of heat by the motor beyond normal heat levels produced. In an embodiment, the pulse width modulation switching frequency may be reduced. In an embodiment, the pulse width modulation switching pattern may be changed from a continuous pattern to a discontinuous pattern to introduce harmonic distortion into the sine wave provided to the motor.

In an embodiment where the drive parameter includes a torque/amp ratio of the drive and motor, the torque/amp ratio may be adjusted by, for example, adjusting an induction saturation curve or a back EMF constant of the motor, and/or by injecting a high frequency component into the waveform. These changed drive parameters may be preprogrammed, selected for implementation by a controller 118, and implemented at a drive such as drive 116 when the controller 118 directs such changes to the drive parameters.

In an embodiment, the adjusted drive parameter determined at 204 may be the pulse width modulation switching frequency, the pulse width modulation frequency switching pattern, and/or the torque/amp ratio delivered from the drive to the motor may be. In an embodiment, the pulse width modulation switching frequency and the pulse width modulation frequency switching pattern may be determined 204 and then compared to excluded pulse width modulation switching frequencies and pulse width modulation frequency switching patterns. The excluded pulse width modulation switching frequencies and pulse width modulation frequency switching patterns may be determined based on predictions or actual testing of acoustic, control stability, stator overheating, or other such issues and stored in a lookup table. When the pulse width modulation switching frequency and the pulse width modulation frequency switching pattern determined at 204 are determined to be within the defined excluded values, determining the adjusted drive parameter at 204 may continue by instead determining an adjusted torque/amp ratio delivered from the drive to the motor, 206, implementing the adjusted torque/amp ratio delivered from the drive to the motor without changing the pulse width modulation switching frequency and the pulse width modulation frequency switching pattern.

The adjusted drive parameters are implemented at the drive at 206. In an embodiment where the adjusted operational parameters are a pulse width modulation switching pattern and/or a pulse width modulation frequency, the drive provides an updated simulated AC sine wave to the motor by operating using the adjusted pulse width modulation switching pattern and/or frequency. In an embodiment where the adjusted drive parameters, include a torque/amp ratio of the drive and motor, the motor and drive are operated with the adjusted induction saturation curve or back EMF constant.

In an embodiment, when the drive parameters are implemented at the drive at 206, the motor generates additional heat during operation. In an embodiment, the stator and/or rotor of the motor has the suction flow of the compressor flowing over it as a coolant, and the excess heat at the stator and/or rotor are transferred to the suction flow entering the compressor. This increased heat at suction results in an increased discharge temperature and greater discharge superheat, which may improve the separation of lubricant and refrigerant in the discharge flow of a compressor system and increase the quality and thus the effectiveness of the recovered lubricant.

In an embodiment, the method 200 iterates periodically, for example returning to 202 after the adjusted drive parameters have been implemented 206 for a predetermined period of time. In an embodiment, changes to the lubrication condition, such as changes to one or more of the lubricant quality metric and the operational state of the compressor may be detected 208 and the process returning to 202 when the change in lubricant quality metric or compressor operational state is detected at 208.

Aspects:

It is understood that any of aspects 1-9 may be combined with any of aspects 10-19.

Aspect 1. A compressor system, comprising:
a compressor including one or more bearings, one or more rotating components supported by the one or more bearings, a suction port, and a discharge port;
a motor coupled to at least one of the one or more rotating components;
a drive, to power the motor; and
a controller, connected to the drive, and configured to vary one or more drive parameters based on a lubrication condition, wherein varying the one or more drive parameters increases a heat produced by at least one of the motor and the drive.

Aspect 2. The compressor system according to aspect 1, wherein the one or more drive parameters include at least one of a pulse width modulation switching frequency and a pulse width modulation frequency switching pattern.

Aspect 3. The compressor system according to aspect 2, wherein varying the pulse width modulation switching frequency and the pulse width modulation frequency switching pattern increases a temperature of the motor.

Aspect 4. The compressor system according to any of aspects 1-3, wherein the one or more drive parameters include a torque/amp ratio of the motor and the drive.

Aspect 5. The compressor system according to aspect 4, wherein varying the torque/amp ratio of the motor and the drive includes at least one of adjusting an induction saturation curve, adjusting a back EMF constant, and injecting a high frequency component.

Aspect 6. The compressor system according to any of aspects 1-5, further comprising a refrigerant flow path configured to convey a refrigerant flow to the suction port of the compressor, and wherein at least one of a stator and a rotor of the electric motor is located in the refrigerant flow path, upstream of the suction port with respect to the refrigerant flow.

Aspect 7. The compressor system according to any of aspects 1-6, wherein the controller is configured to vary the one or more operating parameters based on at least one of a compressor speed, a compressor pressure ratio, a mechanical unloader state, and a compressor volume ratio.

Aspect 8. The compressor system according to any of aspects 1-7, further comprising one or more sensors configured to measure one or more lubricant metrics, and wherein the controller is configured to vary the one or more operating parameters based on the one or more lubricant metrics.

Aspect 9. The compressor system according to aspect 8, wherein the one or more lubricant metrics include a discharge superheat at the discharge port of the compressor.

Aspect 10. A method of operating a compressor system including a compressor, a motor, and a drive, comprising:

determining whether a lubricant is to be refined based on a lubricant condition;

when the lubricant is to be refined, determining one or more adjusted drive parameters, wherein the one or more adjusted drive parameters increases a heat produced by at least one of the motor and/or drive; and operating the motor and the drive based on the one or more drive parameters.

Aspect 11. The method according to aspect 10, wherein the lubricant condition is an operational state of the compressor, and wherein the operational state includes at least one of a compressor speed, a compressor pressure ratio, and a compressor volume ratio.

Aspect 12. The method according to aspect 10, further comprising measuring at least one lubricant metric using one or more sensors located in or on the compressor system, and wherein the lubricant condition is determined based on the lubricant metric.

Aspect 13. The method according to aspect 12, wherein the lubricant metric is a discharge superheat of the compressor.

Aspect 14. The method according to any of aspects 10-13, wherein the one or more adjusted drive parameters include one or more of a pulse width modulation switching frequency and a pulse width modulation frequency switching pattern.

Aspect 15. The method according to aspect 14, wherein the one or more of the pulse width modulation switching frequency and the pulse width modulation frequency switching pattern increase a temperature of a motor of the compressor Aspect 16. The method according to aspect 15, further comprising directing a flow of refrigerant over at least one of a stator and a rotor of the motor prior to the flow of refrigerant entering a suction port of the compressor.

Aspect 17. The method according to any of aspects 10-16, wherein the one or more adjusted drive parameters include a torque/amp ratio of the drive and the motor.

Aspect 18. The method according to aspect 17, wherein the adjusted drive parameters include at least one of an induction saturation curve, a back EMF constant, and a high frequency injection.

Aspect 19. The method according to any of aspects 10-18, wherein determining the one or more adjusted drive parameters comprises referencing a lookup table correlating the lubricant condition with the one or more drive parameters.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A compressor system, comprising:
a compressor including one or more bearings, one or more rotating components supported by the one or more bearings, a suction port, and a discharge port;
a motor coupled to at least one of the one or more rotating components;
a drive, to power the motor;
a lubricant separator, located downstream of the discharge port with respect to a discharge flow of the compressor; and
a controller, connected to the drive, and configured to vary one or more drive parameters based on a lubrication condition, wherein varying the one or more drive parameters increases a heat produced by at least one of the motor and the drive,
wherein the one or more drive parameters include a torque/amp ratio of the motor and the drive.

2. The compressor system of claim 1, wherein varying the torque/amp ratio of the motor and the drive includes at least one of adjusting an induction saturation curve, adjusting a back EMF constant, and injecting a high frequency component.

3. The compressor system of claim 1, further comprising a refrigerant flow path configured to convey a refrigerant flow to the suction port of the compressor, and wherein at least one of a stator and a rotor of the motor is located in the refrigerant flow path, upstream of the suction port with respect to the refrigerant flow.

4. The compressor system of claim 1, wherein the controller is configured to vary the one or more operating parameters based on at least one of a compressor speed, a compressor pressure ratio, a mechanical unloader state, and a compressor volume ratio.

5. The compressor system of claim 1, further comprising one or more sensors configured to measure one or more lubricant metrics, and wherein the controller is configured to vary the one or more operating parameters based on the one or more lubricant metrics.

6. The compressor system of claim 5, wherein the one or more lubricant metrics include a discharge superheat at the discharge port of the compressor.

7. A method of operating a compressor system including a compressor, a motor, and a drive, comprising:
determining whether a lubricant is to be refined based on a lubricant condition;
when the lubricant is to be refined, determining one or more adjusted drive parameters, wherein the one or more adjusted drive parameters increases a loss at one or both of the motor and the drive, wherein the loss at one or both of the motor and the drive generates additional heat; and
operating the motor and the drive based on the one or more adjusted drive parameters
wherein the one or more adjusted drive parameters include a torque/amp ratio of the drive and the motor.

8. The method of claim 7, wherein the lubricant condition is an operational state of the compressor, and wherein the operational state includes at least one of a compressor speed, a compressor pressure ratio, and a compressor volume ratio.

9. The method of claim 7, further comprising measuring at least one lubricant metric using one or more sensors located in or on the compressor system, and wherein the lubricant condition is determined based on the lubricant metric.

10. The method of claim 9, wherein the lubricant metric is a discharge superheat of the compressor.

11. The method of claim 7, wherein the one or more adjusted drive parameters include one or more of a pulse width modulation switching frequency and a pulse width modulation frequency switching pattern.

12. The method of claim 11, wherein the one or more of the pulse width modulation switching frequency and the pulse width modulation frequency switching pattern increase a temperature of a motor of the compressor.

13. The method of claim 7, wherein the adjusted drive parameters include at least one of an induction saturation curve, a back EMF constant and a high frequency injection.

14. The method of claim 7, wherein determining the one or more adjusted drive parameters comprises referencing a lookup table correlating the lubricant condition with the one or more drive parameters.

* * * * *